US006413345B1

(12) United States Patent
Treleaven

(10) Patent No.: US 6,413,345 B1
(45) Date of Patent: Jul. 2, 2002

(54) METHODS FOR FORMING A LABEL

(75) Inventor: Carl W. Treleaven, Greensboro, NC (US)

(73) Assignee: Pharmagraphics (Southeast), L.L.C., Greensboro, NC (US)

( * ) Notice: Subject to any disclaimer, the term of this patent is extended or adjusted under 35 U.S.C. 154(b) by 0 days.

(21) Appl. No.: 09/399,715

(22) Filed: Sep. 21, 1999

Related U.S. Application Data

(62) Division of application No. 08/984,785, filed on Dec. 4, 1997, now Pat. No. 5,975,582.

(51) Int. Cl.[7] .......................... B32B 31/00; B26D 3/08

(52) U.S. Cl. ....................... 156/227; 156/253; 156/265; 156/268; 156/269; 156/270; 156/301; 156/302; 283/70; 283/81; 283/94; 283/101; 283/104; 283/105; 283/106; 40/310; 40/672; 40/674; 40/675

(58) Field of Search .............................. 156/227, 252, 156/253, 265, 269, 270, 301, 300, 299, 302, 268; 283/70, 81, 94, 103, 101, 104, 105, 109, 110, 111, 106; 40/310, 312, 360, 672, 674, 675

(56) References Cited

U.S. PATENT DOCUMENTS

| | | | | |
|---|---|---|---|---|
| 4,529,229 A | | 7/1985 | Glibbery | 283/81 |
| 4,534,582 A | | 8/1985 | Howard | 283/81 |
| 4,621,442 A | | 11/1986 | Mack | 40/2 R |
| 4,621,837 A | | 11/1986 | Mack | 283/105 |
| 4,675,062 A | | 6/1987 | Instance | 156/227 |
| 4,711,686 A | | 12/1987 | Instance | 156/227 |
| 4,744,591 A | | 5/1988 | Instance | 281/5 |
| 4,790,563 A | | 12/1988 | Instance | 283/81 |
| 4,888,078 A | | 12/1989 | Instance | 156/249 |
| 4,894,106 A | | 1/1990 | Instance | 156/227 |
| 4,930,812 A | | 6/1990 | Howard | 281/5 |
| 4,933,043 A | | 6/1990 | Instance | 156/248 |
| 4,955,640 A | | 9/1990 | Anderson | 281/2 |
| 4,991,878 A | | 2/1991 | Cowan et al. | 281/81 |
| 5,021,273 A | | 6/1991 | Kobayashi | 428/40 |
| 5,074,595 A | | 12/1991 | Hill et al. | 283/81 |
| 5,093,187 A | * | 3/1992 | Engelmann et al. | |

(List continued on next page.)

FOREIGN PATENT DOCUMENTS

| | | |
|---|---|---|
| GB | PCT GB91 01472 | 3/1992 |

*Primary Examiner*—Linda Gray
(74) *Attorney, Agent, or Firm*—Myers Bigel Sibley & Sajovec

(57) ABSTRACT

A method of forming a label for displaying information includes providing a release liner having an upper surface. A discrete patch of leaflet adhesive is applied to the upper surface of the release liner. The leaflet adhesive patch has an end edge. A leaflet is provided having a bottom panel and a top panel overlying and connected to the bottom panel along a fold line. The leaflet is applied to the release liner and the leaflet adhesive patch such that a first portion of the bottom panel overlies the leaflet adhesive patch and a second portion of the bottom panel adjacent the fold line extends beyond the end edge of the leaflet adhesive patch. A laminate web is applied over the leaflet and the release liner such that a portion of the laminate web is disposed adjacent the fold line and extends beyond the end edge of the leaflet adhesive patch, the laminate web portion being coated on the underside thereof with a laminate adhesive and being releasably secured directly to the upper surface of the release liner by at least a portion of the laminate adhesive. The portion of the laminate adhesive, the leaflet adhesive patch and the leaflet are relatively applied and positioned such that an adhesive-free gap is defined between the end edge of the leaflet adhesive patch and the portion of the laminate adhesive, the gap underlying the laminate web.

4 Claims, 10 Drawing Sheets

U.S. PATENT DOCUMENTS

| | | | | | |
|---|---|---|---|---|---|
| 5,127,676 | A | | 7/1992 | Bockairo | 283/81 |
| 5,200,243 | A | | 4/1993 | Van Veen | 428/40 |
| 5,207,458 | A | | 5/1993 | Treichel et al. | 283/81 |
| 5,207,746 | A | | 5/1993 | Jones | 283/81 |
| 5,234,735 | A | | 8/1993 | Baker et al. | 428/40 |
| RE34,366 | E | | 9/1993 | Instance | 40/299 |
| 5,262,214 | A | | 11/1993 | Instance | 428/40 |
| 5,263,743 | A | | 11/1993 | Jones | 283/81 |
| 5,290,616 | A | | 3/1994 | Cowan et al. | 428/40 |
| 5,308,119 | A | | 5/1994 | Roshkoff | 283/58 |
| 5,403,636 | A | | 4/1995 | Crum | 428/40 |
| 5,439,721 | A | | 8/1995 | Pedroli et al. | 428/40 |
| 5,449,538 | A | | 9/1995 | Denny | 428/40 |
| 5,470,418 | A | | 11/1995 | Instance | 156/231 |
| 5,588,239 | A | | 12/1996 | Anderson | 40/630 |
| 5,593,749 | A | | 1/1997 | Instance | 428/40 |
| 5,605,730 | A | | 2/1997 | Treleaven | 428/40.1 |
| 5,651,235 | A | * | 7/1997 | Ashley et al. | |
| 5,700,537 | A | | 12/1997 | Instance | 428/41.9 |
| 5,727,819 | A | | 3/1998 | Grosskopf et al. | 283/81 |
| 5,738,382 | A | | 4/1998 | Grosskopf et al. | 283/81 |
| 5,766,716 | A | | 6/1998 | Barry | 428/40.1 |
| 5,804,271 | A | | 9/1998 | Barry | 428/40.1 |
| 5,830,550 | A | | 11/1998 | Treleaven et al. | 428/40.1 |
| 5,863,628 | A | | 1/1999 | Barry | 428/40.1 |
| 6,120,637 | A | * | 9/2000 | Barry | 156/252 |

* cited by examiner

METHODS FOR FORMING A LABEL

RELATED APPLICATIONS

This is a divisional application of U.S. application Ser. No. 08/984,785, filed Dec. 4, 1997, now U.S. Pat. No. 5,975,582 the disclosure of which is hereby incorporated herein in its entirety.

FIELD OF THE INVENTION

The present invention is directed to an extended text label, and, more particularly, to an extended text label for pharmaceutical and like uses having multiple panels including a base panel, a marginal portion, a laminate cover, and means to access and selectively detach and remove the laminate cover and further panels from the label, the label having an adhesive-free zone and being particularly well-suited for application to round containers.

BACKGROUND IF THE INVENTION

In the packaging of certain chemicals and pharmaceuticals, the manufacturer is often required or desires to provide a considerable amount of information concerning the chemical or pharmaceutical. In the case of pharmaceuticals, this is required by government regulations, however, the occasion may also arise, either separate from or in conjunction with government regulations, to provide the doctor, pharmacist or user with instructions on how the product should be used, what the product is, and safety precautions which should be followed in the use of the product. Sometimes the literature, which is generally in the form of folded leaflets, is placed within a box along with the container carrying the chemical or pharmaceutical (referred to as "inserts"). The placement of leaflets within the box is expensive and a cumbersome operation to perform. Also, it is difficult to insure by later inspection that the proper literature has been inserted in the proper package. Most all products are packaged in outer cartons and many are not compatible with inserts. Further, the use of folded cartons is under scrutiny by environmental groups, as involving excessive packaging. In an effort to meet this challenge, many companies are looking at ways to eliminate folding cartons that carry containers inside.

A different approach to solving this problem has developed over the last several years in which the folded literature is releasably attached to the face of the container (referred to as "outserts"), either directly to the container itself, or to a base label which, in turn, is secured to the container. The literature may then be removed by the customer. In such cases, the portion of the label remaining must carry both an "identification" of the product, for example, information such as trademark, manufacturer, etc., as well as certain "statutory information" (for example, lot number and expiration date).

Thus, in order to meet the objectives of such labeling techniques, certain criteria must be met. First of all, the portion of the label which remains after the folded literature product is removed must contain both the identification of the product, as well as the statutory information concerning the lot number and expiration date. Further, after the literature leaflet is assembled or affixed to the base label, the indicated area for statutory information concerning lot number and expiration date must be accessible for stamping or printing by the pharmaceutical company and visible to the consumer in addition to the identification of the product. The folded leaflet portion remains affixed to the label portion until the customer (doctor, pharmacist, consumer) desires its removal. It is critical that the proper literature must be affixed to the proper base label. Finally, all of the above criteria must be accomplished in a manufacturing technique that insures quality and is cost-effective.

Examples of labels designed to eliminate the separate base panel are disclosed in U.S. Pat. No. 5,290,616 to Cowan and in U.S. Pat. Nos. 5,207,746 and 5,263,743, each to Jones. While the Jones labels and similar known label constructions are well suited for many applications, they suffer from certain significant drawbacks and limitations in manufacture, application, and functionality.

Preferably, the labels are provided as a web comprising a succession of labels disposed on a release liner. It is often desirable to manufacture the labels using "multiple up" books or leaflets. That is, multiple up leaflets including two or more leaflets each are applied to a wide web. The multiple up leaflets are thereafter die cut to form the individual leaflets with strips of waste material disposed between the leaflets of each multiple up leaflet. If the leaflets are directly adhered to the release liner by an adhesive layer, as in the case of the Jones labels, then special provision must be made for removal of the waste portions. Such special provision, if feasible, is typically cumbersome and adds time and expense to the manufacture of the labels. Further, in manufacturing Jones type labels, the die cuts for forming tear lines for removal of selected panels must be accurately placed to avoid cutting through adjacent folds where tear lines are not intended.

When applying leaflets according to the Jones designs to containers, there is occasionally a tendency for the leaflet to lodge against or hang up on the applicator as it is transferred across turn bars and the like. Further, because only a relatively narrow strip of adhesive may feasibly be provided to hold closed the leaflet disclosed in U.S. Pat. No. 5,207,746 to Jones, there exists a substantial risk of the label becoming unfolded during application.

After a label according to either design has been applied to a container, the paper stock from which the label is formed may be subjected to tearing and/or abrasive forces, for example when the container is dropped into a packing crate. The label may be torn to the extent that it is allowed to unfold prematurely.

The Jones type labels and many similar labels require a certain degree of dexterity on the part of the end user in order to open the labels. Also, once the label has been opened, the panels other than the base panel must be removed or otherwise allowed to dangle from the container. In many applications it is preferable that the user have the option of reclosing the label.

Thus, there exists a need for a multiple panel package label which resists tearing and abrasion. There exists a need for such a package label which has greater integrity. Further, there exists a need for a package label which allows for resealability and provides easy access to the multiple panels thereof. There exists a need for a package label as described above which may be efficiently and cost effectively manufactured, and, particularly, which lends itself to manufacture using multiple up leaflets.

One problem commonly encountered with extended text labels is that, because of the thickness of the extended text label, it is often difficult to apply the labels to round containers. When the label is applied to the round container, a substantial differential is created between the inner diameter of the label (i.e., essentially the outer surface of the container) and the outer diameter of the label (i.e., the outer surface of the laminate cover). The thicker the leaflet and the tighter the diameter of the container, the greater the differential will be. As a result, the laminate cover will be pulled overly tight as the label is applied. Such overtightening causes buckling of the laminate cover and may even cause the label to detach from or fail to fully attach to the container.

U.S. Pat. No. 5,200,243 to Van Veen and U.S. Pat. No. 5,588,239 to Anderson each disclose multipanel labels adapted for application to curved surfaces. Each of the labels disclosed includes one or more self-adhesive base labels to which a leaflet or booklet is adhered. The provision of such base labels increases the material costs of the labels and requires a relatively complicated manufacturing process. In particular, the booklets or leaflets must be properly registered with the base labels. Further, the base labels and the adhesive positioned between the base labels and the corresponding booklets or leaflets substantially add to the overall thickness of the label and, hence, the inner diameter/outer diameter differential.

Thus, there exists a need for a label having the features, characteristics and benefits discussed above, and further being well-suited for automated application to round containers. Moreover, such labels should be cost effective and convenient to manufacture.

SUMMARY OF THE INVENTION

The present invention is generally directed to multipanel, extended text labels having laminate covers and which are particularly well-suited for convenient and effective automated application to round containers.

More particularly, the present invention is directed to a label for displaying information and for application and securement to a container of the type having a curved outer surface. The label extends between spaced apart, opposed first and second label end edges. The label includes a leaflet including a bottom panel having a lower surface and a top panel overlying and connected to the bottom panel along a fold line. The fold line forms an end edge of the leaflet adjacent the first label end edge. A leaflet adhesive patch is disposed on the lower surface of the bottom panel and is adapted to secure the bottom panel directly to the outer curved surface of the container. The leaflet adhesive patch has an end edge adjacent the fold line. A laminate cover overlies the top panel and has an extended portion extending between the fold line and the first label end edge. A laminate adhesive layer underlies the laminate cover and secures the laminate cover to the leaflet. A portion of the laminate adhesive layer is adapted to secure the laminate extended portion directly to the curved outer surface of the container. An adhesive-free gap is defined between the end edge of the leaflet adhesive patch and the portion of the laminate adhesive layer, the gap underlying the laminate cover.

The label preferably includes at least one interior panel disposed between the top and bottom panels. Preferably, a portion of the leaflet extends beyond the leaflet adhesive patch and toward the first label end edge such that the fold line is spaced apart from the end edge of the Leaflet adhesive patch and overlies the adhesive-free gap. The leaflet may have a second end edge opposite and spaced apart from the first leaflet end edge, the second leaflet end edge being coextensive with the second label end edge so that the laminate cover does not extend beyond the second leaflet end edge.

The label may include an access tear line formed in the top panel adjacent the fold line and a laminate tear line formed in the laminate cover and overlying the access tear line. A second laminate tear line may be formed in the laminate extended portion, the first and second laminate tear lines defining a tear strip therebetween overlying the adhesive-free gap. Additionally, a separation tear line may be formed in the bottom panel and overlying the adhesive-free gap.

In certain preferred embodiments of the label, one of the top panel and the bottom panel includes a marginal extended flap extending beyond the other of the top panel and the bottom panel and toward the second label end edge. The marginal extended flap has an upper surface and a lower surface. The laminate cover overlies the marginal extended flap and is secured to the upper surface thereof by the laminate adhesive layer. A laminate tear line may be formed in the laminate cover in a location overlying the marginal extended flap. The leaflet adhesive patch may extend continuously from the end edge of the leaflet adhesive patch to a terminal edge of the marginal extended flap. Preferably, the marginal extended flap is coextensive with the second label end edge. The label may include indicia disposed on the upper surface of the marginal extended flap.

The label as described above may be releasably secured to a release liner having an upper surface. The bottom panel is releasably secured directly to the release liner upper surface by the leaflet adhesive patch and the laminate extended portion is releasably secured directly to the release liner upper surface by the portion of the laminate adhesive layer.

The present invention is farther directed to a label as follows for displaying information and for application and securement to a container of the type having a curved outer surface. The label extends between spaced apart, opposed first and second label end edges. The label includes a leaflet including a bottom panel having a lower surface and a top panel overlying and connected to the bottom panel along a fold line. The fold line forms an end edge of the leaflet adjacent the first label end edge. A marginal extended flap forms a part of the bottom panel and extends beyond the top panel opposite the fold line and toward the second label end edge. The marginal extended flap has an upper surface and a lower surface. A leaflet adhesive patch is disposed on the lower surface of the bottom panel and is adapted to secure the bottom panel directly to the curved outer surface of the container. The leaflet adhesive patch has an end edge adjacent the fold line. A laminate cover overlies the top panel and the marginal extended flap. The laminate cover has an extended portion extending between the fold line and the first label end edge. A laminate adhesive layer underlies the laminate cover and secures the laminate cover to the leaflet. A portion of the laminate adhesive layer is adapted to secure the laminate extended portion directly to the curved outer surface of the container. An adhesive-free gap is defined between the end edge of the leaflet adhesive patch and the portion of the laminate adhesive layer, the gap underlying the laminate cover.

Preferably, the label includes at least one interior panel disposed between the top and bottom panels. Preferably, a portion of the leaflet extends beyond the leaflet adhesive patch and toward the first label end edge such that the fold line is spaced apart from the end edge of the leaflet adhesive patch and overlies the adhesive-free gap. The marginal extended flap may terminate at a second leaflet end edge, the second leaflet end edge being coextensive with the second label end edge so that the laminate cover does not extend beyond the second leaflet end edge.

In certain preferred embodiments, the label includes an access tear line formed in the top panel adjacent the fold line and a laminate tear line formed in the laminate cover and overlying the access tear line. A laminate removal tear line may be formed in the laminate cover at a location overlying the marginal extended flap. A second laminate tear line may be formed in the laminate extended portion, the first and second laminate tear lines defining a tear strip therebetween overlying the adhesive-free gap. Additionally, a separation tear line may be formed in the bottom at a location overlying the adhesive-free gap.

The laminate cover may be releasably and releasably secured to the upper surface of the marginal extended flap by the laminate adhesive layer.

The leaflet adhesive patch may extend continuously from the end edge of the leaflet adhesive patch to a terminal edge of the marginal extended flap. Indicia may be disposed on the upper surface of the marginal extended flap.

The label as described above may be releasably secured to a release liner having an upper surface. The bottom panel is releasably secured directly to the release liner upper surface by the leaflet adhesive patch and the laminate extended portion is releasably secured directly to the release liner upper surface by the portion of the laminate adhesive layer.

The present invention is further directed to a label as follows for displaying information and for application and securement to a container of the type having a curved outer surface. The label extends between spaced apart, opposed first and second label end edges. The label includes a leaflet including a bottom panel having a lower surface and a top panel overlying and connected to the bottom panel along a fold line. The fold line forms an end edge of the leaflet adjacent the first label end edge. A marginal extended flap forms a part of the top panel and extends beyond the bottom panel opposite the fold line and toward the second label end edge. The marginal extended flap has an upper surface and a lower surface. A leaflet adhesive patch is disposed on the lower surface of the bottom panel and on the lower surface of the marginal extended flap. The leaflet adhesive layer is adapted to secure the bottom panel directly to the curved outer surface of the container. The leaflet adhesive patch has an end edge adjacent the fold line. A laminate cover overlies the top panel and has an extended portion extending between the fold line and the first label end edge. A laminate adhesive layer underlies the laminate cover and secures the laminate cover to the leaflet. A portion of the laminate adhesive layer is adapted to secure the laminate extended portion directly to the outer curved surface of the container. An adhesive-free gap is defined between the end edge of the leaflet adhesive patch and the portion of the laminate adhesive layer, the gap underlying the laminate cover.

The label preferably includes at least one interior panel disposed between the top and bottom panels. Preferably, a portion of the leaflet extends beyond the leaflet adhesive patch and toward the first label end edge such that the fold line is spaced apart from the end edge of the leaflet adhesive patch and overlies the adhesive-free gap. The marginal extended flap may terminate at a second leaflet end edge, the second leaflet end edge being coextensive with the second label end edge so that the laminate cover does not extend beyond the second leaflet end edge.

The label may include an access tear line formed in the top panel adjacent the fold line and a laminate tear line formed in the laminate cover and overlying the access tear line. Additionally, a leaflet removal tear line may be formed in the marginal extended flap and a laminate removal tear line may be formed in the laminate cover overlying the leaflet removal tear line.

The leaflet adhesive patch may extend continuously from the end edge of the leaflet adhesive layer to a terminal edge of the marginal extended flap. The label may include indicia disposed on the upper surface of the marginal extended flap.

The label as described above may be releasably secured to a release liner having an upper surface. The bottom panel and the marginal extended flap are releasably secured directly to the release liner upper surface by the leaflet adhesive patch and the laminate extended portion is releasably secured directly to the release liner upper surface by the portion of the laminate adhesive layer.

The present invention is further directed to a label as follows for displaying information and for application and securement to a container of the type having a curved outer surface. The label extends between spaced apart, opposed first and second label end edges. The label includes a leaflet including a bottom panel having a lower surface and a top panel overlying and connected to the bottom panel along a fold line. The fold line forms an end edge of the leaflet adjacent the first label end edge. A marginal extended flap forms a part of the top panel and extends beyond the bottom panel opposite the fold line and toward the second label end edge. The marginal extended flap has an upper surface and a lower surface. A first leaflet adhesive patch is disposed on the lower surface of the bottom panel and is adapted to secure the bottom panel directly to the curved outer surface of the container. The first leaflet adhesive patch has an end edge adjacent the marginal extended flap of the top panel. A second leaflet adhesive patch is disposed on the lower surface of the marginal extended flap and is adapted to secure the lower surface of the bottom marginal extended flap directly to the curved outer surface of the container. A laminate cover overlies the top panel. A laminate adhesive layer underlies the laminate cover and secures the laminate cover to the leaflet. An adhesive-free gap is defined between the end edge of the first leaflet adhesive patch and the second leaflet adhesive patch, the gap underlying the top panel.

The label preferably includes at least one interior panel disposed between the top and bottom panels. Preferably, the marginal extended flap terminates at a second leaflet end edge, the second leaflet end edge being coextensive with the second label end edge so that the laminate cover does not extend beyond the second leaflet end edge.

The label may include an access tear line formed in the top panel adjacent the fold line and a laminate tear line formed in the laminate cover and overlying the access tear line. Additionally, a leaflet removal tear line may be formed in the marginal extended flap and a laminate removal tear line may be formed in the laminate cover overlying the leaflet removal tear line.

The laminate cover may include an extended portion extending beyond the fold line, a portion of the laminate adhesive layer adapted to secure the laminate extended portion directly to the outer surface of the container. Indicia may be disposed on the upper surface of the marginal extended flap.

The label as described above may be releasably secured to a release liner having an upper surface. The bottom panel is releasably secured directly to the release liner upper surface by the first leaflet adhesive patch and the lower surface of the marginal extended flap is releasably secured directly to the release liner upper surface by the second leaflet adhesive patch.

The present invention is further directed to a method of forming a label for displaying information. A release liner is provided having an upper surface. A discrete patch of leaflet adhesive is applied to the upper surface of the release liner, the leaflet adhesive patch having an end edge. A leaflet having a bottom panel and a top panel overlying and connected to the bottom panel along a fold line is provided. The leaflet is applied to the release liner and the leaflet adhesive patch such that a first portion of the bottom panel overlies the leaflet adhesive patch and a second portion of the bottom panel adjacent the fold line extends beyond the end edge of the leaflet adhesive patch. A laminate web is applied over the leaflet and the release liner such that a portion of the laminate web is disposed adjacent the fold line and extends beyond the end edge of the leaflet adhesive patch, the laminate web portion being coated on the underside thereof with a laminate adhesive and being releasably secured directly to the upper surface of the release liner by at least a portion of the laminate adhesive. The portion of the laminate adhesive, the leaflet adhesive patch and the leaflet are relatively applied and positioned such that an adhesive-free gap is defined between the end edge of the leaflet adhesive patch and the portion of the laminate adhesive, the gap underlying the laminate web.

The method may further include the step of diecutting through at least the laminate web to form a laminate cover coextensive with the label. Preferably, the step of diecutting includes cutting through the leaflet.

The present invention is further directed to a method as follows for forming a label for displaying information, A release liner is provided having an upper surface. A first discrete adhesive patch is applied to the upper surface of the release liner. The first adhesive patch has a first end edge. A second discrete adhesive patch is applied to the upper surface of the release liner. The second adhesive patch has a second end edge spaced apart from the first end edge. An adhesive-free gap is defined between the first and second end edges. A leaflet is applied over the release liner and each of the first and second adhesive patches such that a first portion of the leaflet overlies the first adhesive patch, a second portion of the leaflet overlies the second adhesive patch and a third portion of the leaflet between the first and second portions overlies the adhesive-free gap.

The method may further include the step of applying a self-adhesive laminate web over the leaflet. Additionally, the method may further include the step of diecutting through at least the laminate web to form a laminate cover coextensive with the label. Preferably, the step of diecutting includes cutting through the leaflet.

In the method as described above, the step of applying a leaflet may include applying a leaflet having a bottom panel and a top panel overlying and connected to the bottom panel along a fold line, the top panel having a marginal extended flap extending beyond the bottom panel opposite the fold line. The first portion of the leaflet which is applied over the first adhesive patch includes at least a portion of the marginal extended flap and the second portion of the leaflet which is applied over the second adhesive patch includes at least a portion of the bottom panel.

The present invention is further directed to a method as follows for forming a label for displaying information and for applying the label to a container. A laminate web is provided having a laminate adhesive on one face thereof. A multipanel leaflet is applied to the one face of the laminate web such that the leaflet is secured to the laminate web by the laminate adhesive and a bottom panel forming a part of the leaflet is exposed opposite the laminate web. Thereafter, a layer of leaflet adhesive is applied to the bottom panel such that a portion of the bottom panel adjacent an end edge of the leaflet remains adhesive-free. The leaflet and a portion of the laminate web are applied to the container such that the leaflet is secured to the container by the leaflet adhesive and the laminate web portion is secured to the container by a portion of the laminate adhesive. Simultaneous with or following the step of applying the leaflet and the laminate web portion to the container, at least the laminate web is diecut through to form the label including a laminate cover. The adhesive-free portion of the bottom panel adjacent the leaflet end edge provides an adhesive-free gap between the leaflet adhesive and the laminate adhesive portion. The gap is positioned between the laminate cover and the container. Preferably, the step of diecutting includes cutting through the leaflet.

A primary object of the present invention is to provide a multiple panel label which may be cost-effectively, properly and conveniently applied to round containers.

An object of the present invention is to provide a multiple panel package label which resists tearing and abrasion.

An object of the present invention is to provide such a package label which has enhanced integrity.

A further object of the present invention is to provide a multiple panel package label which allows for resealability.

A further object of the present invention is to provide a multiple panel label which provides easy access to the information on the multiple panels. In particular, it is an object of the present invention to provide such a label which allows a significant margin of error in manufacture.

An object of the present invention is to provide a label in which the printed components thereof may be formed from a unitary construction, thereby eliminating the risk of mismatching such components.

An object of the present invention is to provide a label the back side of which may be printed on, such printing being visible, for example, through a clear container to which the label has been adhered by its back side.

Yet another object of the present invention is to provide a package label as described above which may be efficiently and cost effectively manufactured. In particular, an object of the present invention is to provide a package label as described above which lends itself to manufacture using multiple up leaflets.

The preceding and further objects of the present invention will be appreciated by those of ordinary skill in the art from a reading of the figures and the detailed description of the preferred embodiment which follow, such description being merely illustrative of the present invention.

DETAILED DESCRIPTION OF THE PREFERRED EMBODIMENTS

Figure 1:
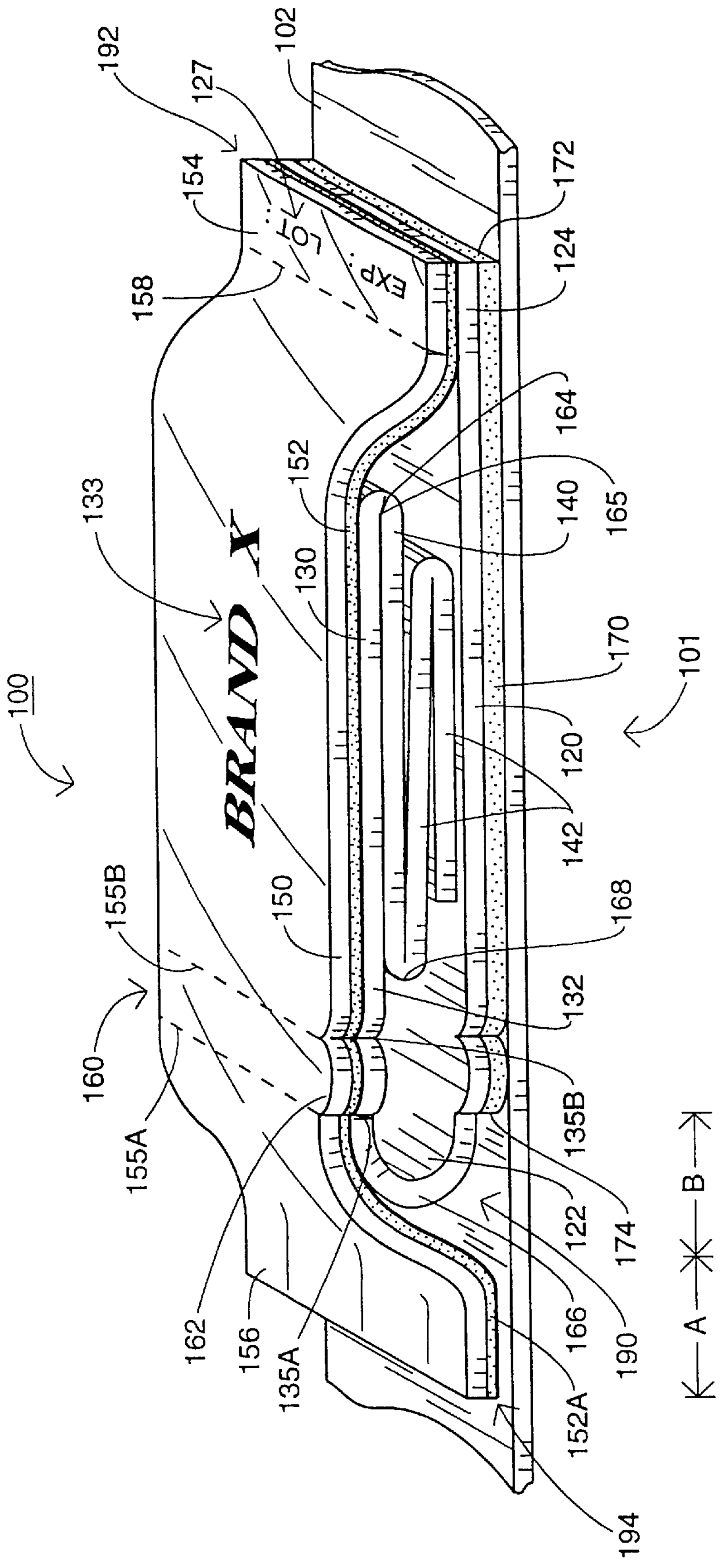
FIG. 1 is a perspective view of a label according to a first embodiment of the present invention disposed on a release liner.
Figure 3:
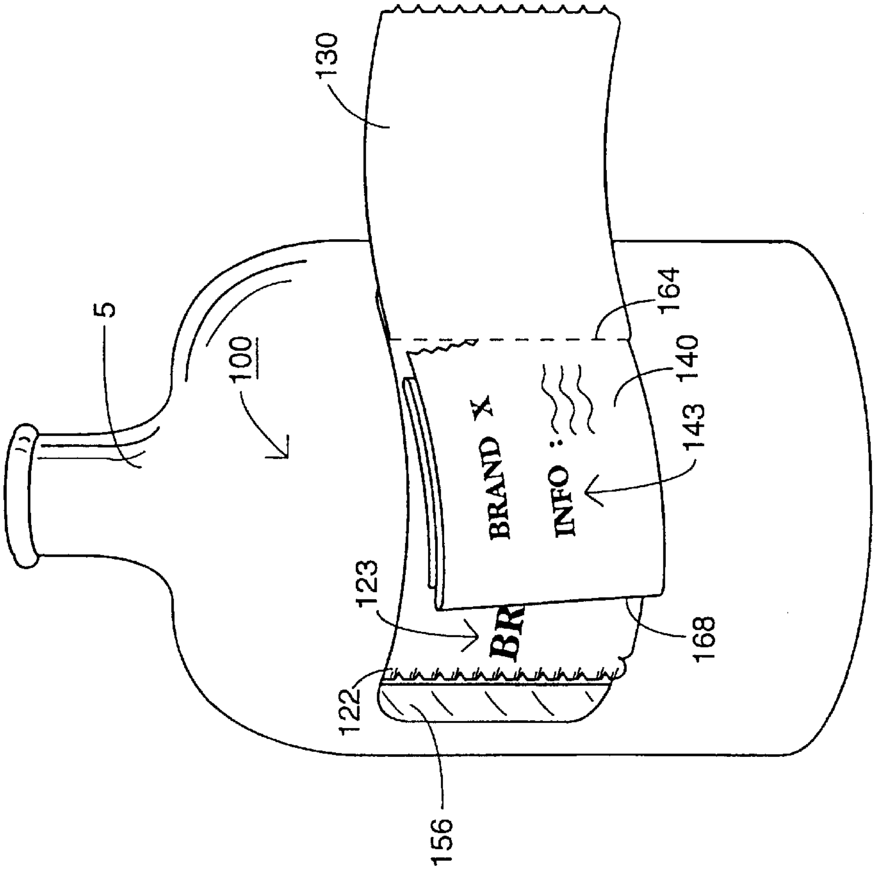
FIG. 3 is a perspective view of the label of the first embodiment secured to a container, the tear strip being completely removed and the first interior panel thereof partially removed.
Figure 2:
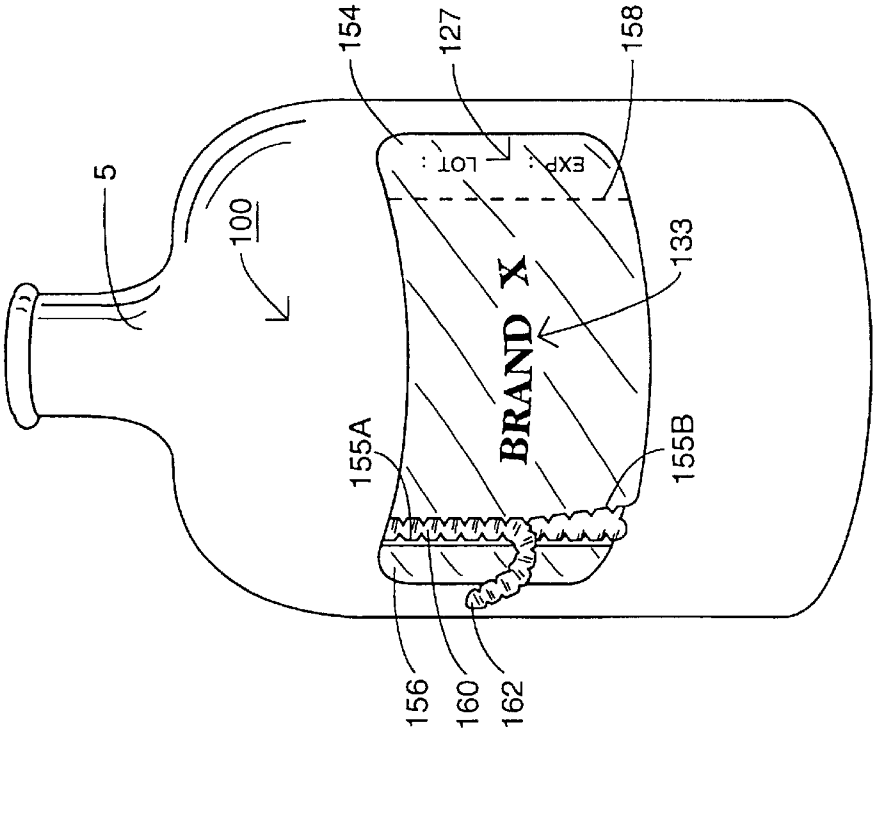
FIG. 2 is a perspective view of the label of the first embodiment secured to a container, the tear strip thereof being partially removed.

With reference to FIGS. 1–3, a label according to a first embodiment of the present invention, generally denoted by the numeral 100, is shown therein. Label 100 includes leaflet 101 and laminate cover 150. Label 100 extends from leading edge 194 to trailing edge 192. It will be appreciated that the edges could be reversed such that the leading edge is the trailing edge and the trailing edge is the leading edge. Label 100 is releasably secured to release liner 102 by adhesive layer patch 170 and adhesive layer portion 152A. Each of adhesive layer 170 and adhesive layer 152A remain with label 100 when it is removed from release liner 102 and serve to secure label 100 to a container 5 (FIGS. 2 and 3). An adhesive-free zone or gap 190 is defined between adhesive layer 170 and adhesive layer 152A and extends the width of the label. The provision of gap 190 facilitates application of the label to round containers.

Label 100 includes tear strip 160 and tear lines 158 and 164 which provide for access to and detachment of the various panels of leaflet 101, as discussed in more detail below.

Leaflet 101 includes bottom panel 120, top panel 130, first interior panel 140, and additional interior panels 142. Top panel 130 and bottom panel 120 are joined along fold 166. Top panel 130 and first interior panel 140 are joined along the fold 165. Fold 166 forms a leading edge of the leaflet. Top panel 130 includes parallel, spaced apart tear lines 135A and 135B formed therein. Tear line 164 is formed along fold 165 (as shown) or, alternatively, in panel 140 adjacent fold 165. Top panel 130 includes marginal portion 132 extending between fold 166 and the adjacent edge 168 of interior panel 140. Bottom panel 120 includes marginal portion 122 extending between fold 166 and adjacent edge 168. Bottom panel 120 further includes marginal extended flap 124 extending outwardly beyond top panel 130. Suitable title indicia 133 is printed on the upper surface of top panel 130. Marginal extended flap 124 preferably extends at least one-half inch beyond the longest of the top and interior panels, and more preferably from about one-half to five-eighths of an inch. Indicia 127 such as "EXP:" and "LOT:" are printed on the upper surface of marginal extended flap 124. Indicia 123, preferably substantially identical to indicia 133, is disposed on the upper surface of bottom panel 120. Other suitable indicia 143, for example, instructions and warnings, are printed on panels 140, 142.

Leaflet 101 is preferably formed from a unitary blank of 60 lbs. coated paper or litho stock. Methods and apparatus for forming leaflets 101 will be appreciated by those of ordinary skill in the art upon a reading of the foregoing and the following. Moreover, leaflet 101 is preferably diecut from a "multiple up" leaflet as discussed below.

Laminate cover 150 overlies leaflet 101 and is secured thereto by laminate adhesive 152. More particularly, laminate portion 154 is secured to the upper surface of marginal extended flap 124, laminate portion 156 is releasably adhered by laminate adhesive layer portion 152A to release liner 102, and the remainder of laminate cover 150 is secured to the upper surface of top panel 130. Laminate portion 156 preferably has a width A extending between fold 166 and leading edge 194 of about ½ inch. Tear lines 155A and 155B are formed in laminate cover 150 overlying tear lines 135A and 135B, respectively, of top panel 130. Tear line 158 is formed in laminate cover 150 preferably adjacent fold 165. Indicia (not shown) such as "EXP:" and "LOT:" may be printed on the upper surface of laminate portion 156.

Laminate cover 150 is preferably formed from polypropylene. Suitable laminate materials include, for example, 2 mil biaxially oriented polypropylene product no. P3219 available from JAC Canada Ltd. of Boudreau, Quebec, Canada. Laminate adhesive 152 is preferably E326 adhesive also available from JAC Canada Ltd. Adhesive 152 should be a pressure sensitive adhesive which permanently adheres to the intended substrate (i.e., the container). In this regard, "permanent" means that the laminate cover portion adhered to the container cannot be removed from the container without significantly damaging or destroying the laminate cover, the container surface or both.

The portion of laminate cover 150 defined between tear lines 155A and 155B and the portion of top panel 130 defined between tear lines 135A and 135B together form tear strip 160. Preferably, label 100 is formed such that tear strip 160 includes tab 162 to facilitate manipulation of the tear strip. Tear strip 160 lies entirely in marginal portion 132 and overlies only marginal portion 122 of bottom panel 120. Marginal portions 122, 132 are preferably from about ¼ to about ⅜ inch wide each. Further, tear line 135B is formed from about ⅛ to about 3/16 inch from adjacent edge 168.

Adhesive layer patch 170 has leading edge 174 and trailing edge 172. Adhesive-free gap 190 is defined between adhesive leading edge 174 and laminate adhesive portion 152A. In applying label 100 to a round container or the like, gap 190 facilitates uniform, proper and consistent securement to the container. More particularly, gap 190 accommodates the differential between the inner and outer diameters of the label. In particular, gap 190 allows relative displacement between bottom panel 120 and laminate cover 150 as the label is applied to the container. Hence, the provision of gap 190 prevents buckling or poor securement of the label as commonly occurs in the case of laminated, multiple panel labels not having such provision.

Gap 190 preferably has a width B extending from adhesive leading edge 174 to laminate adhesive portion 152A of from about ⅛ to ⅜ inch. In practice, laminate adhesive portion 152A will begin substantially immediately adjacent fold 166 so that the distance between leading edge 174 and fold 166 is substantially the same as width B.

Label 100 may be applied to a package using any suitable application equipment. Preferably, the end of label 100 beginning at edge 192 is first applied to the packages in order to provide full advantage from gap 190.

With reference to FIGS. 2 and 3, a label 100 is shown therein secured to a suitable container 5 by adhesive layer 170. Prior to manipulation by the end user, label 100 is positioned in the closed and sealed position of FIG. 1. In this position, indicia 127 and 133 are visible. When the end user wishes to open label 100 to inspect indicia 123 and/or indicia 143, he or she may do so by grabbing tab 162 and pulling tear strip 160 downwardly and outwardly (as shown in FIG. 2), thereby severing top panel 130 along tear lines 135A, 135B, 155A, and 155B. Thereafter, the end user may fold top panel 130 outwardly as shown in FIG. 3. Once label 100 has been opened as described above, the end user may remove top panel 130 (and the portion of laminate cover 150 adhered thereto) and interior panels 140, 142 by tearing along tear line 158 of laminate cover 150. Alternatively, the end user may remove interior panels 140, 142 by tearing along tear line 164, leaving top panel 130 and the attached portion of laminate cover 150 with container 5.

Because gap 190 insures that laminate cover 150 is not overly tensioned, label 100 may be cost-effectively and conveniently applied to a round container such that it is smoothly and uniformly secured to the container. A further advantage provided by gap 190 is a reduction in "adhesive ooze", i.e., the tendency for adhesive to migrate out from beneath the label when applied to a container. The gap provides additional space beneath the label into which the adhesive may migrate rather than migrating beyond the periphery of the label. Moreover, label 100 provides the benefits of a laminated label, including durability and manufacturing convenience. The label provides ease of access to the information printed on the leaflet. The label also provides the capability to remove various portions from the container as desired while insuring that certain information remains with the container.

Figure 4:
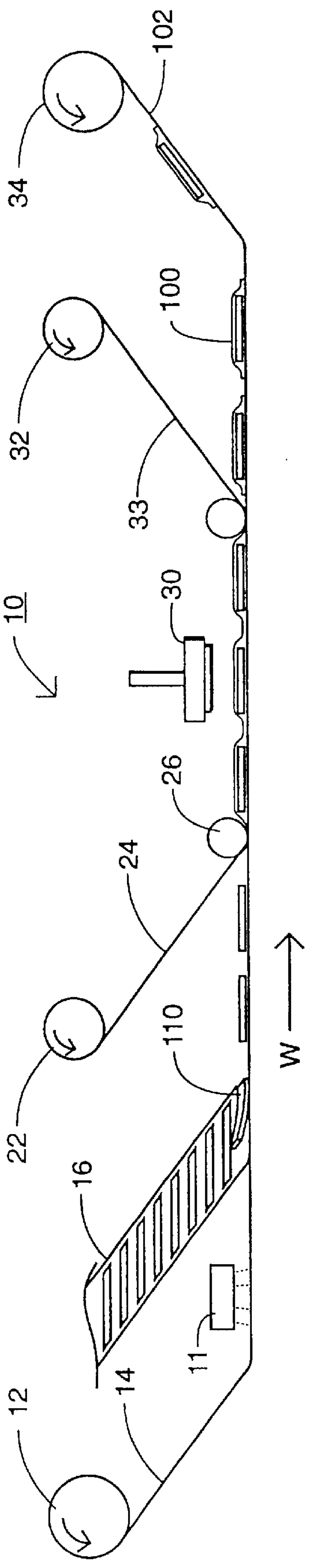
FIG. 4 is a schematic diagram of an apparatus for forming labels according to the first embodiment.

With reference to FIG. 4, an apparatus for forming labels 100 is shown therein. First, a suitable release liner web 14 is supplied in direction W from unwind station 12. Web 14 may be a release liner such as 1.5 mil polyester liner with medium release, part no. 54004 available from Fasson, Inc. of Painesville, Ohio.

Figure 5:
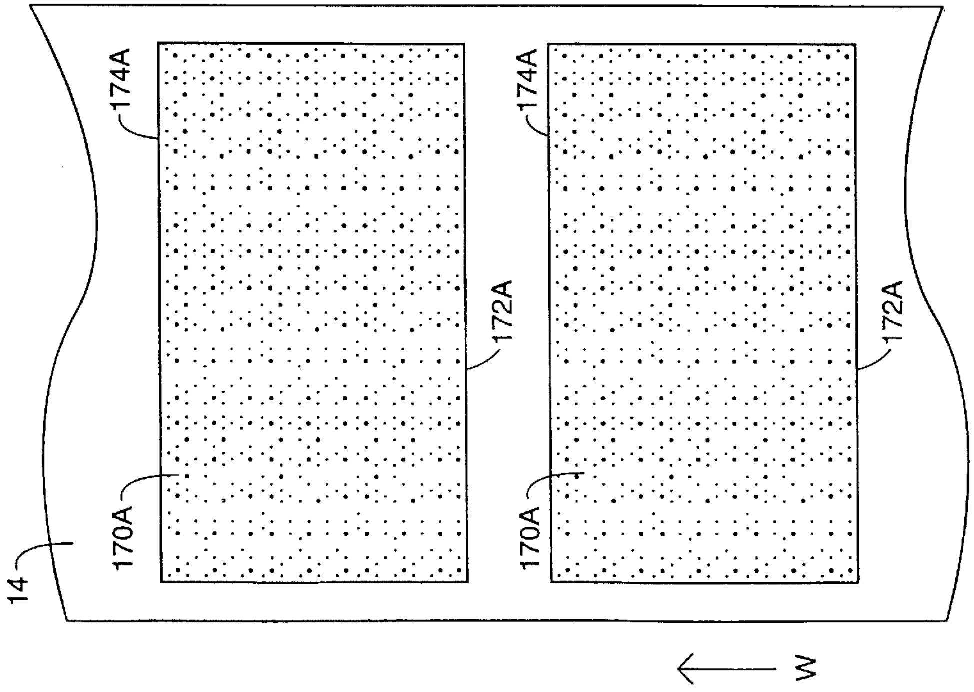
FIG. 5 is a fragmentary, top plan view of the release liner of the first embodiment with spaced apart adhesive patches coating the upper surface thereof.

With reference to FIG. 5, a series of spaced apart, discrete adhesive patches 170A are applied along the length of web 14 by adhesive application station 11. Adhesive 170A is preferably a pressure sensitive hot melt adhesive, however, other types of adhesives may be used. Suitable pressure sensitive hot melt adhesives include hot melt available from Croda Adhesives of Itasca, Ill. Adhesive application station 11 is preferably an adhesive screen printer, for example a Rotary Screen Coating System available from Nordson Corporation of Amherst, Ohio. Adhesive 170 should be a permanent adhesive with respect to the container surface, as discussed above with regard to laminate adhesive 152. Patches 170A correspond generally to adhesive layers 170 of the finished labels 100.

Figure 6:
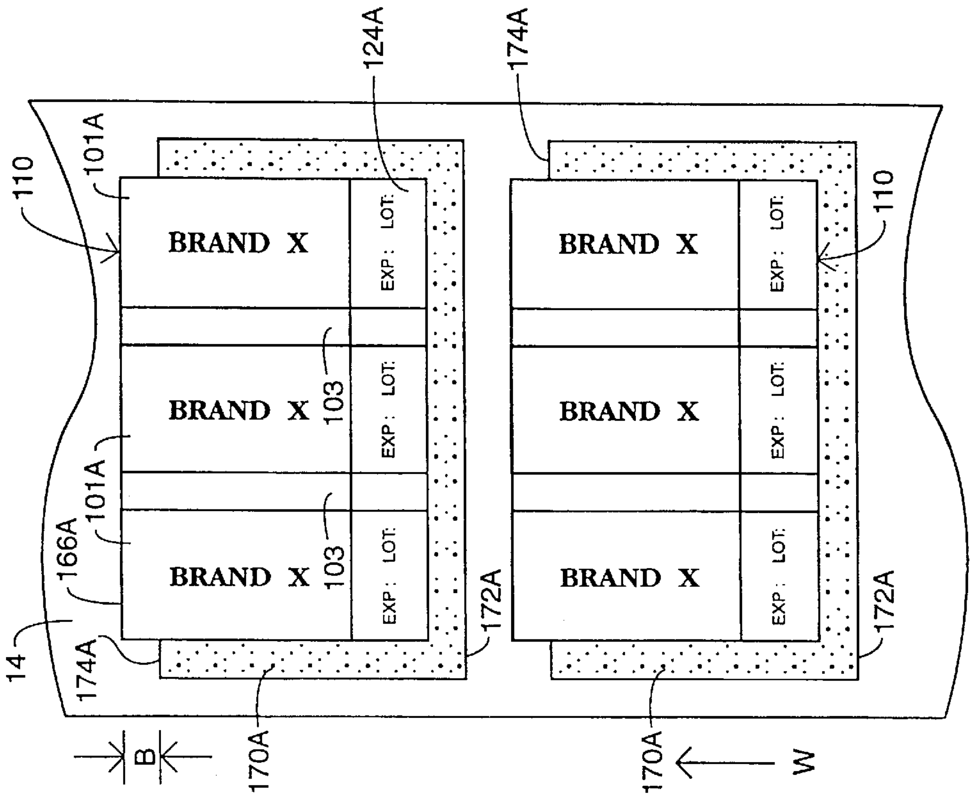
FIG. 6 is a fragmentary, top plan view of the release liner and adhesive patches of FIG. 5 with multiple up leaflets applied thereto.

Multiple up leaflets 110 are applied to the upper surface of release liner 14 and to adhesive patches 170A by leaflet application station 16. As shown in FIG. 6, each multiple up leaflet 100 is a unitary leaflet including a plurality of side by individual leaflet portions 101A printed with the appropriate indicia of leaflets 100 (including indicia 127). Leaflet portions 101A are joined by waste portions 103. Each leaflet portion 101A has a portion 124A corresponding to portion 124 of leaflet 101. Each multiple up leaflet 110 is placed on a respective adhesive patch 170A such that fold 166A of the multiple up leafet extends beyond leading edge 174A of patch 170 the distance B. The side edges and trailing edge 172A of patch 170A extend beyond the side and trailing edges of the multiple up leaflet.

Thereafter, self adhesive laminate web 24 is supplied by unwind station 22 and adhered by nip roller 26 and the adhesive thereof over multiple up leaflets 110 and web 14. Die cutter station 30 cuts through multiple up leaflet 110 and laminate web 24 forming laminate covers 150 and leaflets 101. More particularly, the die cut separates each leaflet portion 101A from waste portions 103. Further the diecut is formed about ⅛ inch inwardly of the side edges and the trailing edge of multiple up leaflet 110 to insure that each leaflet 101 so formed is fully coated with adhesive 170 on its underside (except adjacent fold 166 where adhesive is deliberately omitted to form gap 190), especially beneath portion 124, and that each leaflet is entirely covered by a respective laminate cover 150.

Each of tear lines 135A, 135B, 155A, 155B, and 158 may be formed by die cut station 30 or a further die cut station. Moreover, tear lines 135A, 135B, and 164 may be formed in multiple up leaflet 110 prior to application to the web. Tear lines (not shown) may be formed in the bottom panel underlying tear lines 135A and 135B if desired or to facilitate manufacture.

Waste matrix 33 including the portions of laminate web 24 outside laminate covers 150, the portions of adhesive 170A outside of adhesive layers 170, waste portions 103, and the portions of leaflets 110 outside of leaflets 101 are removed by winding station 32. Preferably, laminate web 24 is sufficiently wide to remove all of the waste materials outside of labels 100 from web 14 so that only labels 100 remain on the web. The resulting labels 100 carried on web 14 may then be collected on a roll by winding station 34 or sheeted and stacked. Web 14 may be slit to form a plurality of release liner webs 102 with labels 100 spaced single file along the length thereof.

Preferably, appropriate relative spacing, placement, unwinding and registry of the webs, leaflets and adhesive patches are accomplished by properly synchronizing the respective operations. Alternatively, some or all of the operations may be automatically controlled responsive to suitable sensors.

The actual expiration date and the actual lot number corresponding to the associated container may be printed on laminate portion 154 as appropriate, for example, just prior to or after application of the label to the container. If the prompting indicia "EXP:" and "LOT:" are to be provided on laminate portion 154 or laminate portion 156, such indicia may be printed at any time following application of the laminate web over the leaflet.

Figure 7:
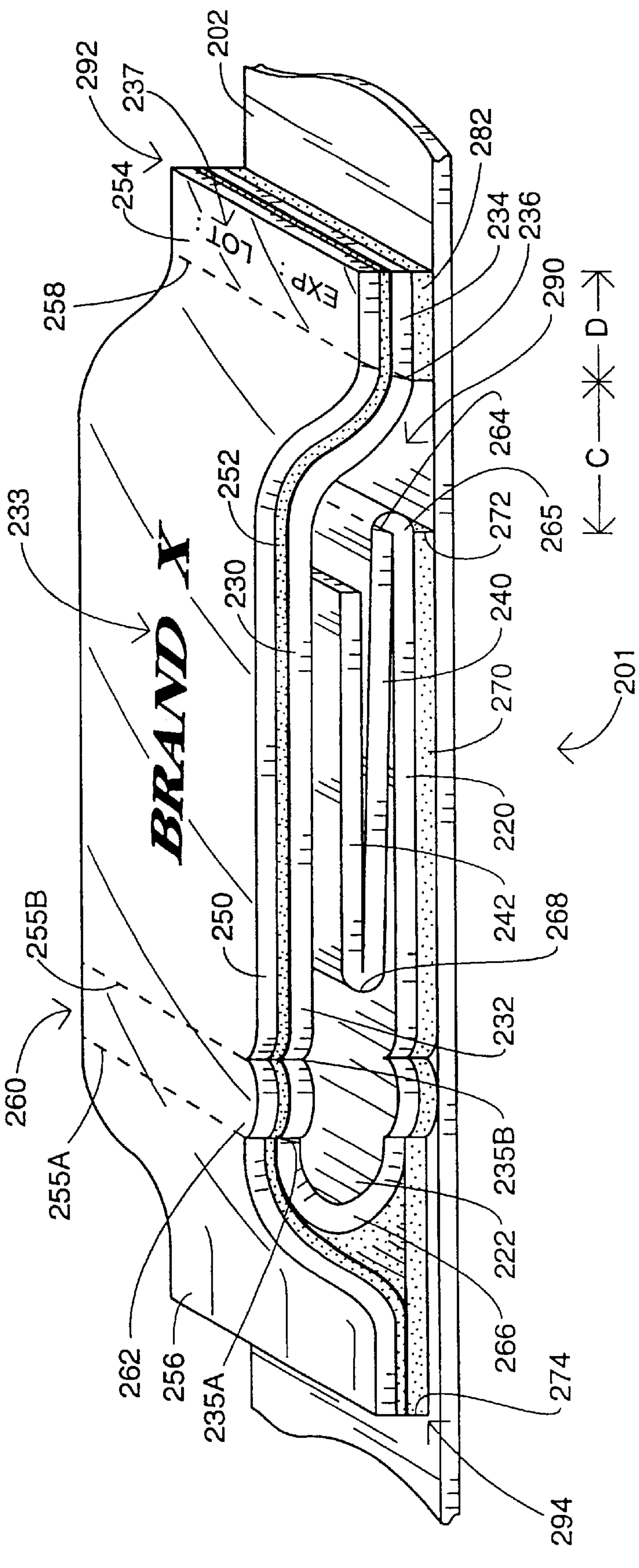
FIG. 7 is a perspective view of a label according to a second embodiment of the present invention disposed on a release liner.
Figure 8:
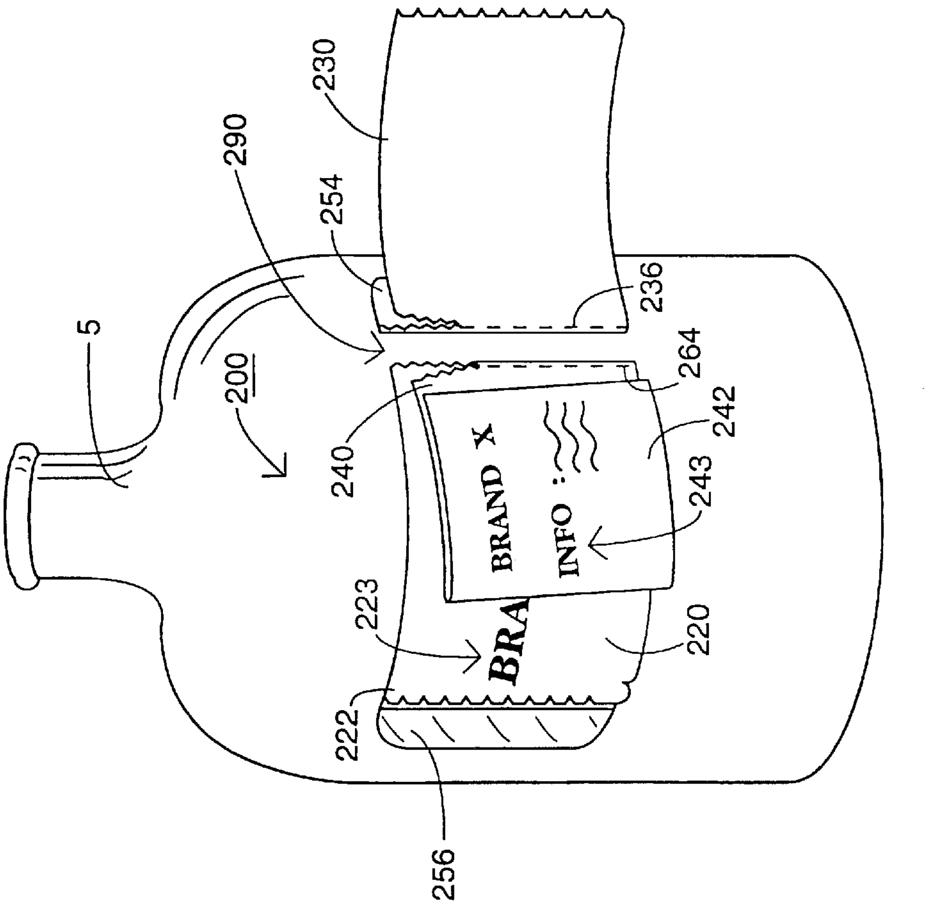
FIG. 8 is a perspective view of the label of the second embodiment secured to a container, the tear strip being completely removed and the top panel and the first interior panel, each partially removed.

With reference to FIGS. 7 and 8, a label according to a second embodiment, generally denoted by the numeral 200, is shown therein. Label 200 includes leaflet 201 and overlying laminate cover 250. Label 200 is releasably secured to release liner 202 by adhesive layer patch 270 and adhesive layer patch 282 which define adhesive-free zone or gap 290 therebetween. Elements 222, 232, 233, 235A, 235B, 242, 250, 252, 254, 255A, 255B, 256, 260, 262, 266, 292, and 294 of label 200 correspond to elements 122, 132, 133, 135A, 135B, 142, 150, 152, 154, 155A, 155B, 156, 160, 162, 166, 192, and 194, respectively. Label 200 differs from label 100 as follows.

Bottom panel 220 is joined to first interior panel 240 along fold 265. Tear line 264 is formed along fold 265 or, alternatively, in first interior panel 240 adjacent fold 265. Top panel 230 includes marginal extended flap 234 which extends outwardly beyond fold 265 and is coated on its under surface with adhesive 282. Marginal extended flap 234 preferably extends at least one-half inch beyond the longest of the bottom and interior panels, and more preferably from about one-half to five-eighths of an inch. Tear line 236 is formed in top panel 230 adjacent fold 265. Tear line 258 is formed in laminate cover 250 and overlies tear line 236. Indicia 237 is disposed on the upper surface of marginal extended flap 234. Marginal portions 222, 232 are defined between fold 266 and adjacent edge 268 of interior panel 240. Adhesive layer 270 extends continuously from trailing edge 272 to leading edge 274, including beneath fold 266 and laminate marginal portion 256.

Gap 290 which extends across the width of label 200 is formed between adhesive trailing edge 272 and adhesive layer 282, rather than adjacent fold 266. Adhesive layer 282 is not a portion of laminate adhesive 252. Adhesive layer 282 directly secures marginal extended flap 234 of the leaflet to release liner 102. Leading edge 274 of adhesive layer 270 is coextensive with leading edge 294 of label 200. Adhesive patch 282 preferably has a width D of about ½ inch. Gap 290 preferably has a width C of from about ⅛ to ⅜ inch.

It will be appreciated that by the provision of gap 290, label 200 provides the same benefits as label 100 in applying label 200 to a round container. Additionally, label 200 provides convenient accessibility in use and the durability and handling benefits of the laminate cover.

With reference to FIG. 8, label 200 is shown therein secured to a suitable container 5. As shown in the figure, tear strip 260 has been removed as discussed above with respect to label 100. Top panel 230 (as well as the overlying portion of laminate cover 250) and first interior panel 240 are shown partially removed. It will be appreciated that the end user is presented with the options of removing top panel 230 by tearing along tear line 236 and tear line 258, removing interior panels 240 and 242 by tearing along tear line 264, or both.

Label 200 may be formed using the same materials, methods and apparatus as discussed above with respect to label 100, except as follows.

Figure 9:
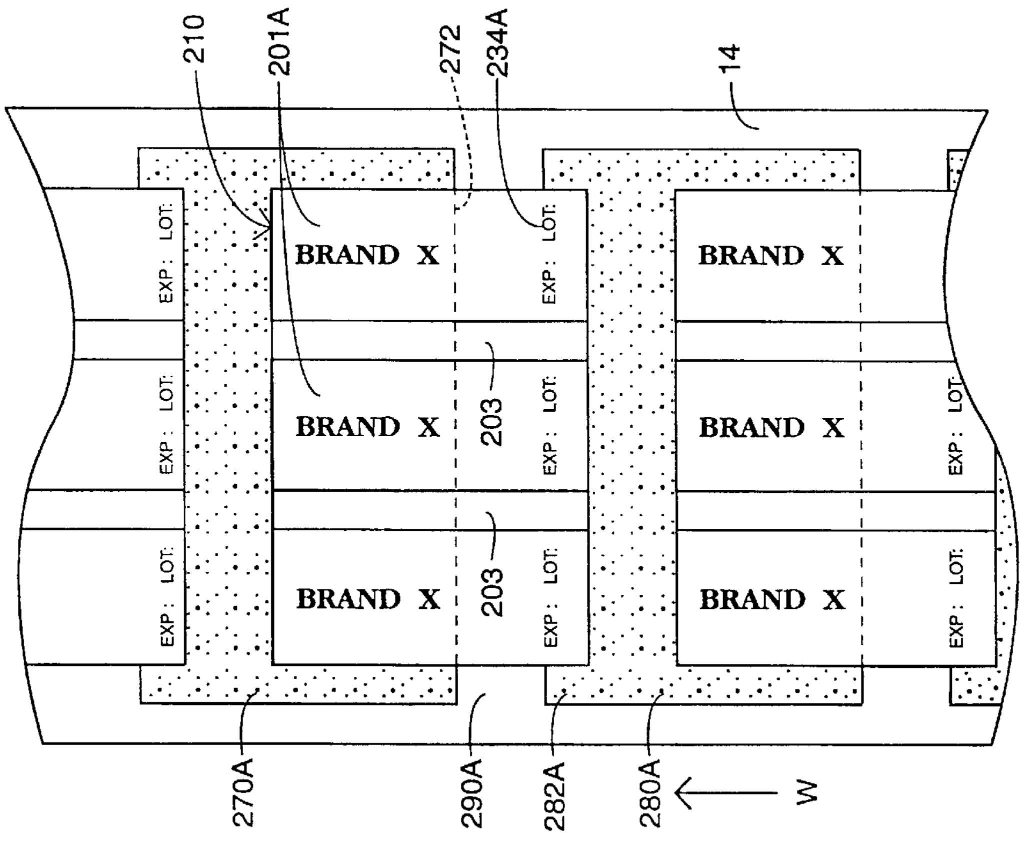
FIG. 9 is a fragmentary, top plan view of the release liner of the second embodiment having spaced apart adhesive patches and multiple up leaflets disposed thereon.

With reference to FIGS. 4 and 9, adhesive application station 11 applies a series of spaced apart, discrete adhesive patches 270A, 280A and so forth along the length of release liner 14. Multiple up leaflet 210 is applied by leaflet application station 16 such that the leaflet covers a substantial portion of adhesive patch 270A, covers a leading portion 282A of adhesive patch 280, and spans gap 290A therebetween. Multiple up leaflet 210 includes individual leaflet portions 201A and waste portions 203. After laminate web 24 is applied over leaflet 210 and adhesive patches 270A and 280A, the laminate web and leaflet 210 are diecut to form side by side labels 200. Preferably the die cuts are formed inwardly of the peripheral edges of multiple up leaflet 210 on all sides to insure that label 200 is fully coated with adhesive on its underside, except in gap 290. Adhesive layer patches 282 are formed from adhesive portion 282A of adhesive patch 280, gap 290 corresponds to gap 290A, and adhesive layer patches 270 are formed from adhesive patch 270A. Preferably, adhesive patches 270A and 280A (and, therefore, adhesive layers 270 and 282) are each formed of the same type adhesives as described above for adhesive 170 of the label according to the first embodiment.

Figure 10:
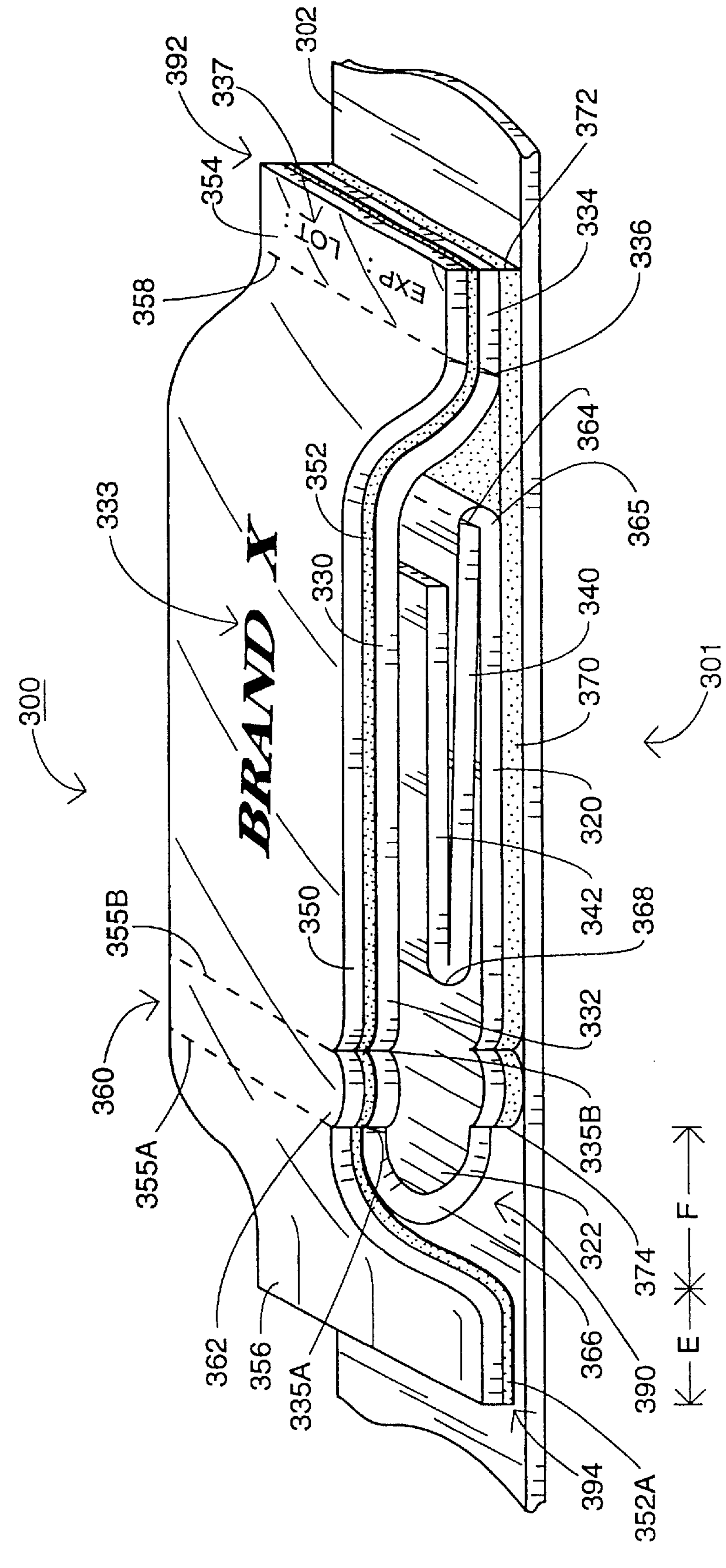
FIG. 10 is a perspective view of a label according to a third embodiment of the present invention disposed on a release liner.

With reference to FIG. 10, a label 300 according to a third embodiment of the present invention is shown therein disposed on a release liner 302. Label 300 includes leaflet 301 having elements 320, 322, 332, 330, 333, 334, 335A, 335B, 336, 337, 340, 342, 350, 352, 354, 355A, 355B, 356, 358, 360, 362, 365, 366, 392, and 394 corresponding to elements 220, 222, 232, 230, 233, 234, 235A, 235B, 236, 237, 240, 242, 250, 252, 254, 255A, 255B, 256, 258, 260, 262, 265, 266, 292, and 294, respectively, of label 200 (FIG. 7).

Label 300 differs from label 200 in that label 300 is releasably secured to release liner 302 by adhesive layer patch 370 (having trailing edge 372 and leading edge 374) corresponding to adhesive layer 170 of the first embodiment and laminate adhesive portion 352A corresponding to laminate adhesive portion 152A of the first embodiment. Gap 390 defined between adhesive leading edge 374 and laminate adhesive portion 352A preferably has a width dimension F extending from edge 374 to portion 352A of from about ⅛ to ⅜ inch, and laminate portion 356 preferably has a width E extending between fold 366 and edge 394 of about ½ inch.

It will be appreciated from the foregoing description that label 300 may be formed from the same materials and using the same methods and apparatus as described above with regard to label 100.

Figure 11:
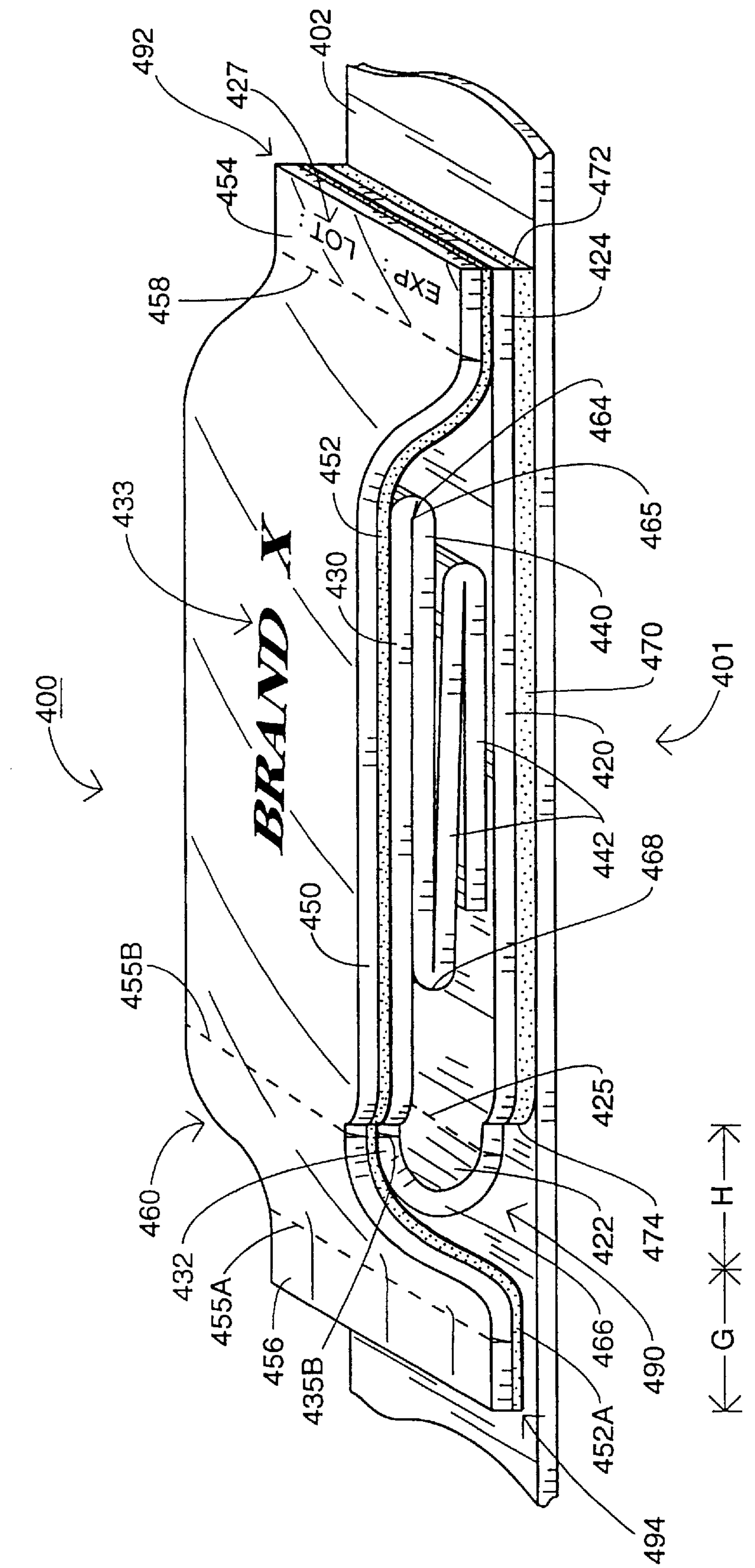
FIG. 11 is a perspective view of a label according to a fourth embodiment of the present invention disposed on a release liner.

With reference to FIG. 11, a label 400 according to a fourth embodiment is shown therein releasably secured to release liner 402. Label 400 includes elements 401, 420, 422, 424, 427, 430, 432, 433, 440, 442, 450, 452, 452A, 454, 456, 458, 460, 464, 465, 466, 470, 472, 474, 490, 492, and 494 corresponding to elements 101, 120, 122, 124, 127, 130, 132, 133, 140, 142, 150, 152, 152A, 154, 156, 158, 160, 164, 165, 166, 170, 172, 174, 190, 192, and 194, respectively, of label 100, except as follows.

Whereas label 100 is provided with tear lines 135A, 135B, 155A, and 155B forming tear strip 160 overlying adhesive layer 170 and positioned entirely between fold 166 and leading edge 174, label 400 includes the following provisions for opening and removing portions of the label. Tear line 455B is formed through laminate cover 450 and tear line 435B is formed coextensively therewith through panel 430. Tear line 425 is formed through panel 420. Each of tear lines 425, 435B, and 455B are positioned between adhesive layer leading edge 474 and fold 466. Preferably, tear line 425 is formed from about ⅛ to 3⁄16 inch away from leading edge 474. A further tear line 455A is formed through laminate portion 456. Dimensions G and H correspond to dimensions A and B of label 100 and are preferably of the same values.

Label 400 may be opened by pulling away the portion or strip 460 of the laminate cover between tear lines 455A and 455B, thereby tearing the label along tear lines 425, 435B, 455A, and 455B. As a result, the portion of leaflet 401 between tear line 425 and leading edge 494 (including fold 466) is removed. A "clean" removal is thereby made so that this portion of the leaflet does not remain on and blemish the package.

It will be appreciated from the foregoing that label 400 may be formed from the same materials and using the same methods and apparatus as for label 100. Tear line 425 is preferably formed in the leaflet when printed, prior to folding and application of the leaflet onto the release liner web.

Tear strips 160, 260, 360, 460 are substantially easier to manipulate than conventional tear lines. It is not necessary for the user to wedge a finger underneath the top panel, but rather he or she need only grasp the tab of the tear strip. Grasping of the tear strip is facilitated by the provision of marginal portions 122, 132, 222, 232, 322, 332, 422, 432 which provide a gap between end folds 166, 266, 366, 466 and the interior panels. This gap also allows tear lines 135A, 135B, 155A, 155B, 235A, 235B, 255A, 255B, 335A, 335B, 435B to be formed without significant risk of perforating file interior panels in an undesired location.

In the case of label 300, it has been found that adhesive from adhesive layer 370 tends to ooze or migrate into the area of leaflet 301 between fold 365 and the adjacent portion of top panel 330. This adhesive serves to detachably secure fold 365 and/or first interior panel 340 to top panel 330. As a result, when label 300 is removed from release liner 302, leaflet 301 will tend to maintain the configuration shown in FIG. 10. That is, bottom panel 320 will not fall downwardly away from the remainder of the label. This is particularly important when the label is being applied to containers using automatic dispensing equipment.

The laminate covers 150, 250, 350, 450 provide particular benefits to the respective labels. The laminate covers serve to protect the labels from scuffing and tearing, for example, when the containers bearing the labels are packed and unpacked. The laminate covers allow the leaflets to be formed from a material such as paper stock which is desirable for manufacturing ease and consumer appeal, while providing the integrity provided by a film material. The enhanced integrity is beneficial both in applying the labels to containers and in providing a durable and consistent product on the container.

The laminate covers significantly aid in holding the respective labels closed until it is desired to open them. Moreover, labels 100 and 400 may be modified to provide recsalable labels. In particular, the leaflets of labels 100 and 300 may be formed from a suitable film, such as 3 mil to 7.5 mil Valeron face stock available from Vanlear Flexibles Incorporated of Houston, Tex., and/or the upper surfaces of marginal extended flaps 124, 424 may be coated with a varnish coating such as Product No. L075 available from Paragon Inks, Ltd. of Boxburn, Scotland. In order to make the laminate covers resealable, the materials and adhesives 152, 452 would be chosen such that portions 154, 454 and 124, 424 are releasably and resealably adhered. Tear lines 158, 458 would not be needed and tear strips 160, 460 could be replaced with a single tear line in each of laminate covers 150, 450 and top panels 130, 430 because initial access to the interior panels would be provided by the resealable flaps.

The laminate covers 150, 250, 350, 450 allow the respective labels to be formed from "multiple up" leaflets. As discussed above, once the multiple up leaflet 110, for example, is die cut, waste sections 103, defined between the cut lines forming the respective leaflets must be removed along with the other waste matrix materials. Because the self adhesive laminate web is provided, waste sections 103 will be removed along with the other waste matrix without further provision because of the integrity and continuity of the laminate material. The release liner web may or may not thereafter be slit into individual webs.

As shown in the figures, the portions of labels 100, 200, 300, 400 to the left of the respective tear lines 135A, 235A, 335A, 435B are stepped back as compared with the remainders of the labels. That is, the width of the given label is less at portions 156, 256, 356, 456 than throughout the remaining length of the label, except adjacent tear lines 135B, 235B, 335B where the side edge of the respective label again cuts inwardly to form the tab 162, 262, 362 The end of the respective tab preferably extends outwardly (widthwise) as far as the adjacent side edge of the body of the label construction of the labels. Construction of the labels in this manner allows for easy access and manipulation of the pull tabs 162, 262, 362 by the end user without requiring an additional step in manufacture. Preferably, the portions to the left of the tear strips have a width (i.e., as measured across the web) which is from about 8 to about 12 percent less than the length of the tear strip (including the tab) and the width of the label at its central portion. Preferably the side edge is cut inwardly at tear line 135B, 235B, 335B the same amount. Further, the tabs may be formed at either the top or bottom sides of the labels.

It will be appreciated that the tear strips may be provided on the right sides of the labels. This may be accomplished by rotating the labels 180° and reorienting the indicias appropriately. Further, the tear strip and tabs may be configured to be pulled upwardly or downwardly as desired.

Leaflets 101, 201, 301, 401 may be formed and printed in any suitable manner, such methods and apparatus being known to those of ordinary skill in the art. In particular, both the upper and lower surfaces of each panel may be printed on, including the lower (ultimately adhesive coated) surfaces of the bottom panels. Preferably the adhesive 170, 270, 370, 470 is a clear adhesive so that any indicia disposed on the lower surface of a bottom panel may be viewed through the substrate, for example, the clear glass or plastic of the container to which the label is affixed.

It will be appreciated that labels according to the present invention may be formed without marginal portions in the top and bottom panels. Rather, one or more side edges of the interior panels may extend to or proximate the fold between the top and bottom panels.

It will be appreciated that labels 100, 200, 300, 400 provide the same benefits as provided by U.S. Pat. Nos. 5,207,746 and 5,263,743 to Jones. Namely, because leaflets 101, 201, 301, 401 are formed from a unitary blank, all of the printed components of the labels are unitarily formed. In this way, any risk of mismatching the printed components of the labels (e.g., the inner, instructional panels and the marginal extended flap bearing the lot and expiration information) is eliminated.

Labels corresponding to each of labels 100, 200, 300 and 400 may be provided as "cut labels", i.e., labels which are applied directly to containers without first being mounted on a release liner. For example, with reference to FIG. 12, a label 500 having the same construction as label 100 may be formed and applied to a container 5 using an apparatus 50 as schematically shown.

Figure 12:
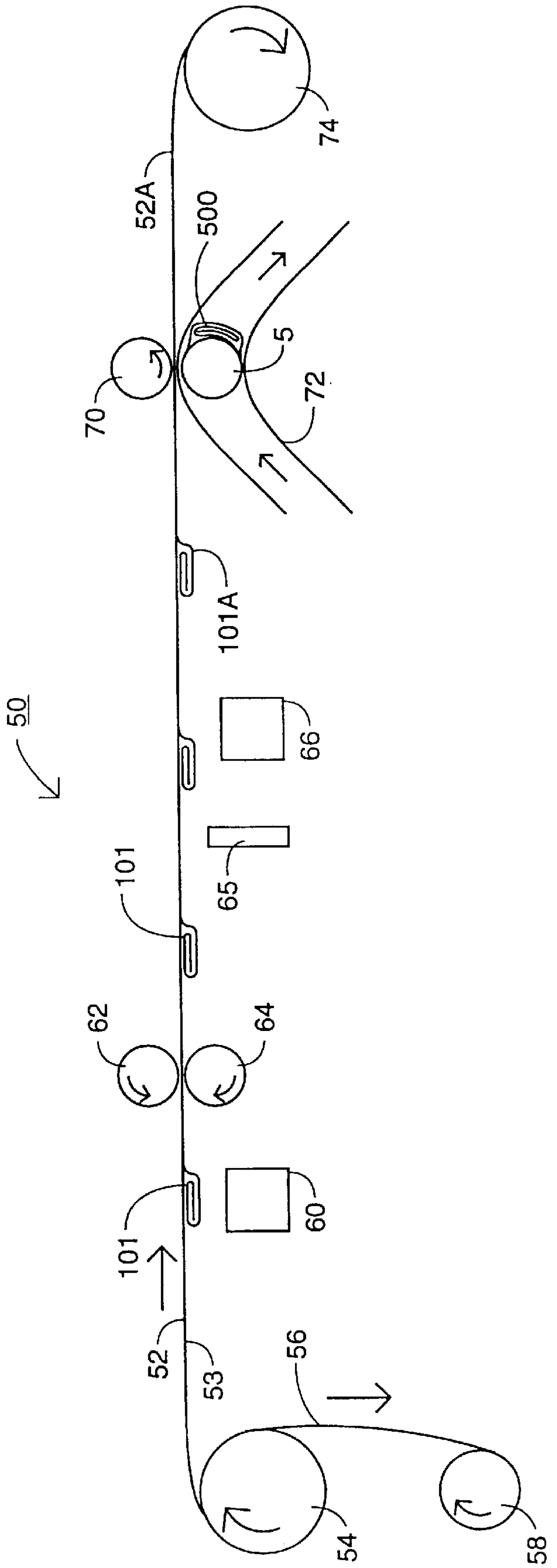
FIG. 12 is a schematic diagram of an apparatus for forming labels according to the present invention and applying the labels to containers without mounting the labels on a release liner prior to application to the containers.

Referring to FIG. 12 in more detail, a clear, adhesive backed overlaminate web 52 is unwound from unwind stand 54. Web 52 is preferably formed of the same material as web 24. Overlaminate web 52 has adhesive 53 on the lower surface thereof, preferably of the type described above for adhesive 152. If the overlaminate web is provided with a release liner 56 covering adhesive 53, the release liner is removed and wound onto rewind stand 58. Leaflets 101 are applied to the adhesive side of overlaminate web 52 by leaflet applicator 60. Web 52 and leaflets 101 carried thereon pass through nip rollers 800 and 802. Nip roller 802 is Teflon coated to prevent adhesive from transferring off of the web.

Web 52, with leaflets 101 adhered thereto by adhesive 53, passes adhesive applicator 900 where adhesive corresponding to adhesive layer patch 170 is applied to the underside of the bottom panel of each leaflet. More particularly, a photodetector 65 detects the leading edge of the leaflet by measuring the differential in opacity. Suitable photodetectors will be apparent to those of ordinary skill in the art upon a reading of this description. Responsive to photodetector 65, adhesive applicator 66 applies adhesive to the underside of the leaflet beginning at the edge of the leaflet corresponding to label edge 192 (see FIG. 1) and terminating at an edge corresponding to edge 174. Accurate placement and proper length of the adhesive are insured by monitoring the speed of the web and timing the start and cessation of adhesive dispensing in accordance therewith.

It will be appreciated that, after passing adhesive applicator 66, the conveyed construction is essentially the same as the construction of FIG. 4 just prior to die cutter 30 except that no release liner web 14 is present. Container 5 travels down lane 72 in the direction indicated. The container arrives adjacent web 52 precisely when the leading edge of the leaflet arrives to intersect container 5. Container 5 is rotated in a clockwise direction so that the leaflet and a portion of laminate web 52 are taken onto the containers outer surface, the leaflet adhered to the container by the adhesive from applicator 66 and the portion of laminate web 52 is adhered to the container by adhesive 53. Die cutter 70, rotating in a counterclockwise direction and using container 5 as a backing surface, cuts through leaflet 101 and laminate web 52 to form label 500 corresponding in all respects to label 100 and secured to the outer surface of container 5. A portion of adhesive 53 corresponds to adhesive portion 152A (see FIG. 1). Waste web 52A consisting of the portions of web 52 and leaflet 101 outside of the diecut is wound onto winding stand 74.

From the foregoing description, it will be appreciated that the extended flap end of the leaflet is applied first to the container. As the leaflet and overlaminate are applied to the container, tension in the overlaminate is relieved by the provision of an adhesive-free gap corresponding to gap 190.

While a preferred embodiment of the present invention has been described, it will be appreciated by those of skill in the art that certain modifications may be made without departing from the scope of the present invention. All such modifications are intended to come within the scope of the claims which follow.

What is claimed is:

1. A method of forming a label for displaying information, said method comprising the steps of:

a) providing a release liner having an upper surface;

b) applying a discrete patch of leaflet adhesive to the upper surface of the release liner, the leaflet adhesive patch having a first, end edge and a second edge;

c) providing a leaflet having a bottom panel and a top panel overlying and connected to the bottom panel along a fold line;

d) applying the leaflet to the release liner and the leaflet adhesive patch such that a first portion of the bottom panel overlies the leaflet adhesive patch; a second portion of the bottom panel adjacent the fold line extends beyond the first, end edge of the leaflet adhesive patch, and a portion of the leaflet adhesive patch adjacent the second edge extends beyond the leaflet;

e) applying a laminate web over the leaflet and the release liner such that a portion of the laminate web is disposed adjacent the fold line and extends beyond the first, end edge of the leaflet adhesive patch, the laminate web portion being coated on the underside thereof with a laminate adhesive and being releasably secured directly to the upper surface of the release liner by at least a portion of the laminate adhesive; and f) wherein the portion of the laminate adhesive, the leaflet adhesive patch and the leaflet are relatively applied and positioned such that an adhesive-free gap is defined between the first, end edge of the leaflet adhesive patch and the portion of the laminate adhesive, the gap underlying the laminate web.

2. The method of claim 1, including the step of diecutting through at least the laminate web to form a laminate cover coextensive with the label.

3. A method of forming a label for displaying information, said method comprising the steps of:

a) providing a release liner having an upper surface;

b) applying a discrete patch of leaflet adhesive to the upper surface of the release liner, the leaflet adhesive patch having an end edge;

c) providing a leaflet having a bottom panel and a top panel overlying and connected to the bottom panel along a fold line;

d) applying the leaflet to the release liner and the leaflet adhesive patch such that a first portion of the bottom panel overlies the leaflet adhesive patch and a second portion of the bottom panel adjacent the fold line extends beyond the end edge of the leaflet adhesive patch;

e) applying a laminate web over the leaflet and the release liner such that a portion of the laminate web is disposed adjacent the fold line and extends beyond the end edge of the leaflet adhesive patch, the laminate web portion being coated on the underside thereof with a laminate adhesive and being releasably secured directly to the upper surface of the release liner by at least a portion of the laminate adhesive; and f) diecutting through at least the laminate web to form a laminate cover coextensive with the label;

g) wherein the portion of the laminate adhesive, the leaflet adhesive patch and the leaflet are relatively applied and positioned such that an adhesive-free gap is defined between the end edge of the leaflet adhesive patch and the portion of the laminate adhesive, the gap underlying the laminate web; and h) wherein said step of diecutting includes cutting through the leaflet.

4. The method of claim 1 wherein the second edge is an end edge opposite the first, end edge.

* * * * *